United States Patent [19]
Asao et al.

[11] Patent Number: 6,158,275
[45] Date of Patent: Dec. 12, 2000

[54] ABRASION DETECTING PROBE FOR A BRAKE MEMBER

[75] Inventors: Kazuhiro Asao; Hitoshi Takanashi, both of Yokkaichi, Japan

[73] Assignee: Sumitomo Wiring Systems, Ltd., Japan

[21] Appl. No.: 09/399,772

[22] Filed: Sep. 21, 1999

[30] Foreign Application Priority Data

Oct. 5, 1998 [JP] Japan ................................. 10-282866

[51] Int. Cl.[7] ........................... G01D 18/00; G01C 17/38
[52] U.S. Cl. ..................................... 73/121; 73/129; 73/7
[58] Field of Search ................................ 73/121, 129, 7, 73/86; 340/454

[56] References Cited

U.S. PATENT DOCUMENTS

| | | | |
|---|---|---|---|
| 4,520,661 | 6/1985 | Tamai et al. | 73/129 |
| 4,655,077 | 4/1987 | Purvis et al. | 73/86 |
| 4,884,434 | 12/1989 | Satake et al. | 73/7 |
| 5,559,286 | 9/1996 | White et al. | 73/129 |
| 5,608,376 | 3/1997 | Ito et al. | 340/454 |
| 5,637,794 | 6/1997 | Hanisko | 73/121 |
| 5,833,033 | 11/1998 | Takanashi . | |

Primary Examiner—Benjamin R. Fuller
Assistant Examiner—Octavia Davis
Attorney, Agent, or Firm—Banner & Witcoff, Ltd.

[57] ABSTRACT

To prevent a detecting electric wire (20) of a brake pad from moving, a stopper member (12) is provided in a holder (10). Two wires (22) extending a wire holder, are made to intersect close to the posterior of a stopper (12), and are maintained in this intersecting state by a cable tie (13). The stopper member (12) engages the intersecting portion (23) of the wire (20) in a posterior direction, thereby preventing the wire (20) from moving in an anterior direction even under a strong pulling force from the rotor R.

12 Claims, 7 Drawing Sheets

ABRASION DETECTING PROBE FOR A BRAKE MEMBER

TECHNICAL FIELD

The present invention relates to an abrasion detecting probe for a brake member.

JP-10-2363 discloses an abrasion detecting probe which detects that the degree of abrasion of a brake pad of an automobile has reached its usage limit. This abrasion detecting probe comprises an electric wire bent into a U-shape, and a supporting member supporting the bent portion of the electric wire in a state whereby the anterior end face thereof protrudes. The abrasion detecting probe is buried in the brake pad with the bent portion thereof facing towards a disc rotor. As a result, the abrasion detecting probe protrudes into a pad face of the brake pad when the brake pad has become abraded. The bent portion of the electric wire begins to be abraded simultaneously with the brake pad as the abrasion continues, and the electric wire breaks when the abrasion of the brake pad reaches its usage limit. This breakage is detected by an open circuit detector, and a warning lamp signalling that the brake pad has reached its abrasion usage limit lights up.

In this abrasion detecting probe, the detecting electric wire is attached to the supporting member as follows. Two through holes are formed in the supporting member, these through holes passing therethrough linearly and in an anterior-posterior direction. The detecting electric wire, having been doubled over, is inserted into the through holes from the anterior direction and protrudes in a posterior direction from the supporting member. The protruding portion thereof is attached to an abrasion detecting circuit.

The disc rotor, while running, revolves at high speed, and if this disc rotor makes contact with the bent portion of the detecting electric wire, a strong and abrupt frictional drag is exerted on the bent portion, and the bent portion is consequently pulled strongly in an anterior direction. If the detecting electric wire portion moves to the anterior, it may break at the posterior of the holder, thereby losing its normal abrasion detecting function. Consequently, a means is required to prevent the bent portion from moving to the anterior when a strong pulling force in an anterior direction is exerted on it.

The present invention has been developed after taking the above problem into consideration, and aims to present a means to prevent the movement of the detecting electric wire.

SUMMARY OF THE INVENTION

According to the invention there is provided a wear sensor for the friction member of a brake, the sensor comprising an elongate wire holder, and a wire bent around one end of the holder, the free ends of the wire extending away from said one end in substantially the same direction, characterised in that said free ends are brought together adjacent the other end of said holder, and held together by a wire retainer, thereby to resist movement in the direction of said one end.

Such a wear sensor resists pulling forces from the brake rotor by constraining the wire on the side of the holder away from the rotor.

Preferably the wire ends insersect. The retainer may be an externally applied band, such as a ratchet cable tie.

The holder may comprise an enclosure for the wire, for example two half-shells, defining an internal channel to guide and confine the wire.

The wire retainer may clamp the wires tightly together.

BRIEF DESCRIPTION OF DRAWINGS

Other features of the invention will be apparent from the following description of several preferred embodiments shown by way of example only in the accompanying drawings in which.

DESCRIPTION OF PREFERRED EMBODIMENT

Figure 1:
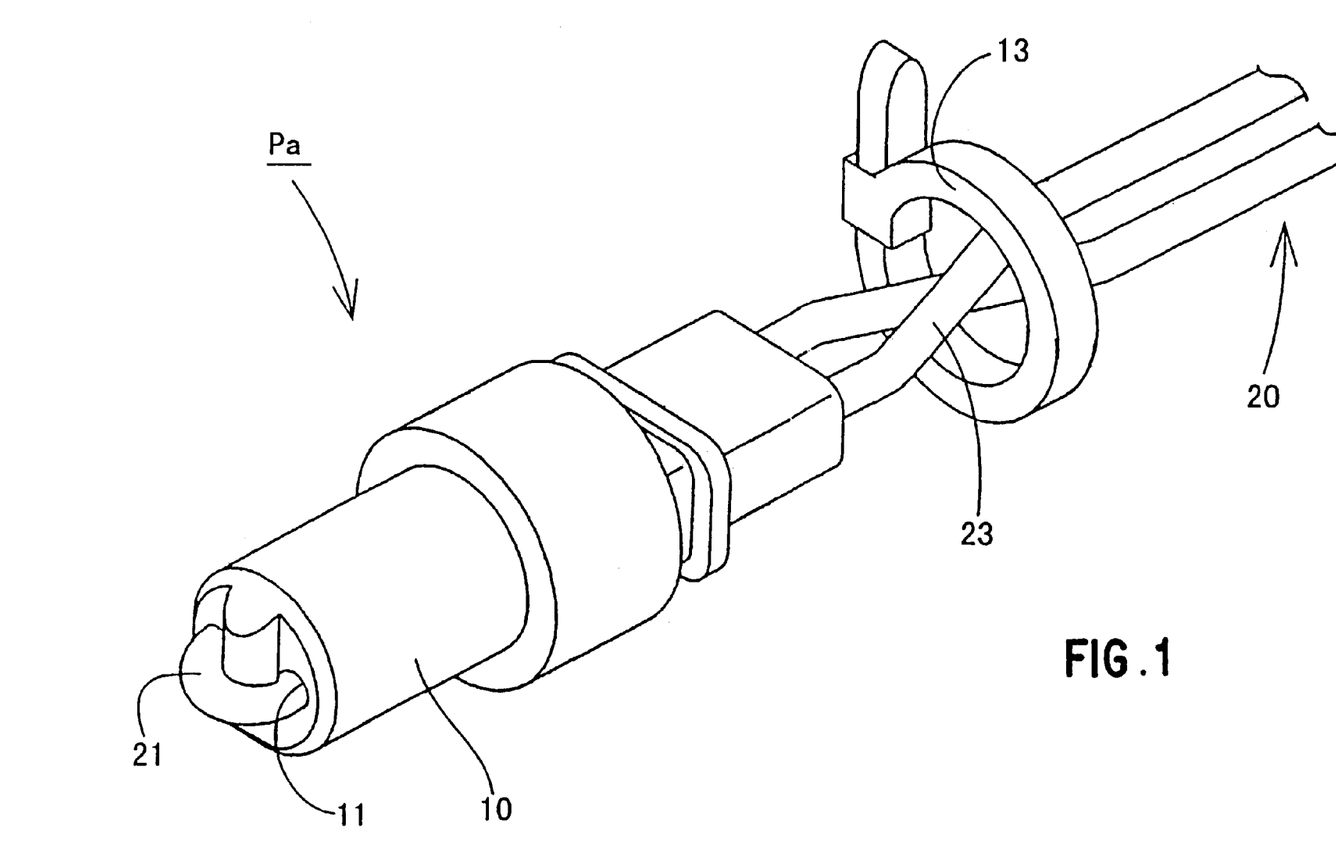
FIG. 1 is a diagonal view of embodiment 1.
Figure 2:
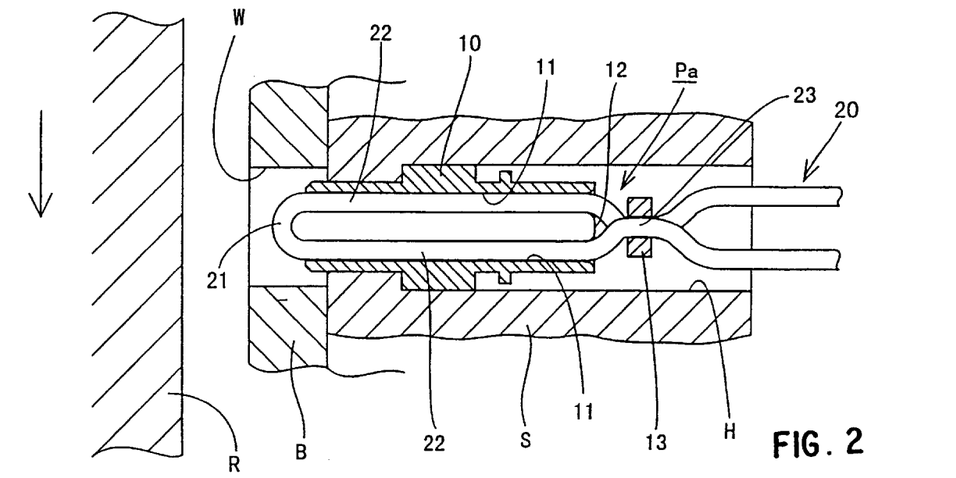
FIG. 2 is a partially cut-away plan view of embodiment 1.
Figure 3:
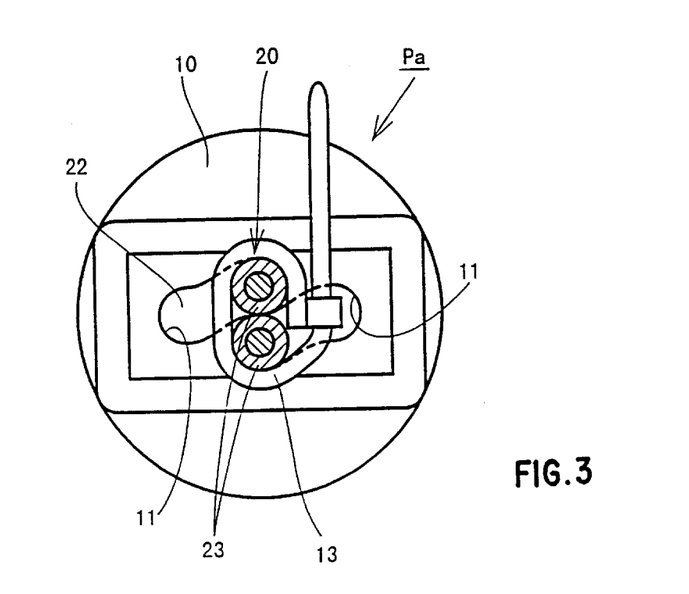
FIG. 3 is a rear face view of embodiment 1.

Embodiment 1 of the present invention is explained below with the aid of FIGS. 1 to 3.

First, the configuration which is the same in later embodiments will be explained. An abrasion detecting probe Pa is used in a conventional disc braking device of an automobile which performs a braking operation by means of a pair of brake linings B which clamp onto a disc-shaped rotor R rotating in an integral manner with a wheel. The abrasion detecting probe Pa comprises a holder 10 and a detecting electric wire 20. The detecting electric wire 20 is bent into a U-shape at an anterior end face of the holder 10. This forms a bent member 21, portions which extend therefrom in a posterior direction being extending members 22. These extending members 22 protrude in a posterior direction from the holder 10 and are attached to an open circuit detector (not shown).

In this abrasion detecting probe Pa, the brake linings B are fixed into attachment holes H provided in fixed support members S, and the bent member 21 of the detecting electric wire 20 at the anterior end face of the holder 10 is positioned in a window hole W of the brake linings B and faces the rotor R. At this juncture, if the abrasion detecting probe Pa is viewed from its front face, the wire of the bent member 21 of the detecting electric wire 20 (the bent member 21 going in the direction of a first through hole 11 to a second through hole 11) is distributed in a direction identical with the direction of rotation of the rotor R when the automobile moved forward (shown by the downwards arrow in FIG. 2).

In conventional brake linings, the abrasion detecting probe Pa does not make contact with the rotor R. However, as the abrasion of the brake lining B continues and reaches a certain thinness, the bent member 21 of the detecting electric wire 20 is also abraded, and the wire soon breaks. This breaking of the detecting electric wire 20 is detected by an open circuit detector, and a warning lamp (not shown) lights up to signal that the brake lining B has reached its abrasion usage limit.

An explanation follows of the means to prevent the movement of the holder 10 of the present embodiment, and to prevent the movement of the detecting electric wire 20 relative to the holder 10. The two through holes 11 are formed in the holder 10 and pass between the anterior and posterior end faces thereof. The extending members 22 of the detecting electric wire 20 (which has been bent into a U-shape at the anterior end face of the holder 10) pass through the two through holes 11 and extend outwards from the posterior end face of the holder 10. Furthermore, a stopper member 12 is formed at the posterior end face of the holder 10 along the area between openings of the two through holes 11. This stopper member 12 regulates movement in an anterior direction of the detecting electric wire 20. The portions of the extending members 22 of the detecting electric wire 20 which extend outwards from the holder 10 mutually intersect at a location close to the posterior of the stopper member 12. This intersection, when seen from a plan view, forms an X-shape. Moreover, this intersecting portion is bound together by a cable band 13. This supports the portion in an intersecting state. This cable band 13 is a conventional component, the loop of which, once tightened, cannot be loosened. As shown in FIG. 2, if the intersecting portion 23 of the detecting electric wire 20 is viewed from above, it extends from opening edges of the two through holes 11 close to the posterior of the stopper member 12, extends diagonally inwards, and is bound together, thus forming a V-shape.

When the bent member 21 of the detecting electric wire 20 comes into contact with the rotor R due to the continuing abrasion of the brake lining B, and when forward movement is occurring at the moment of contact, a strong frictional drag occurs momentarily between the detecting electric wire 20 and the rotor R, and a strong pulling force is consequently exerted on the detecting electric wire 20 from the anterior side (the side of the rotor R). At this juncture, the detecting electric wire 20 may move to the anterior, extending to the anterior of the holder 10 and hanging down, or the detecting electric wire 20 may break at the posterior of the holder 10 and thereby lose its normal abrasion detecting function.

However, in the abrasion detecting probe Pa of the embodiment 1, the detecting electric wire 20 intersects close to the posterior of the stopper member 12 of the holder 10, and the intersecting portion 23 is bound by the cable band 13. As a result, even if a pulling force is exerted in an anterior direction on the detecting electric wire 20, the intersecting portion 23 will catch against the stopper member 12 at the hole edges of the through holes 11, thereby preventing the detecting electric wire 20 from moving in an anterior direction relative to the holder 10.

Further, the stopper member 12 is provided at the posterior end face of the holder 10 and, consequently, there is no need to change the shape of the holder 10 to accommodate the stopper member 12. Rather, conventional holders may be used. In addition, the detecting electric wire 20 is made to intersect, and the intersecting portion 23 thereof is supported by the cable band 13 at a location external to the holder 10. Consequently, the operations of intersecting the detecting electric wire 20 and attaching the cable band 13 to the intersecting portion 23 can be performed easily.

Figure 4:
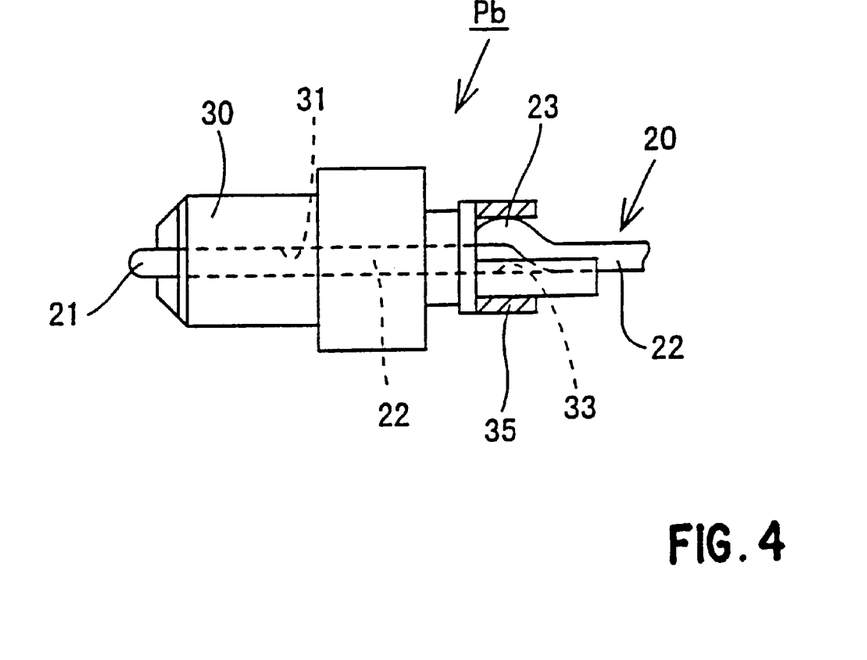
FIG. 4 is a partially cut-away plan view of embodiment 2.
Figure 5:
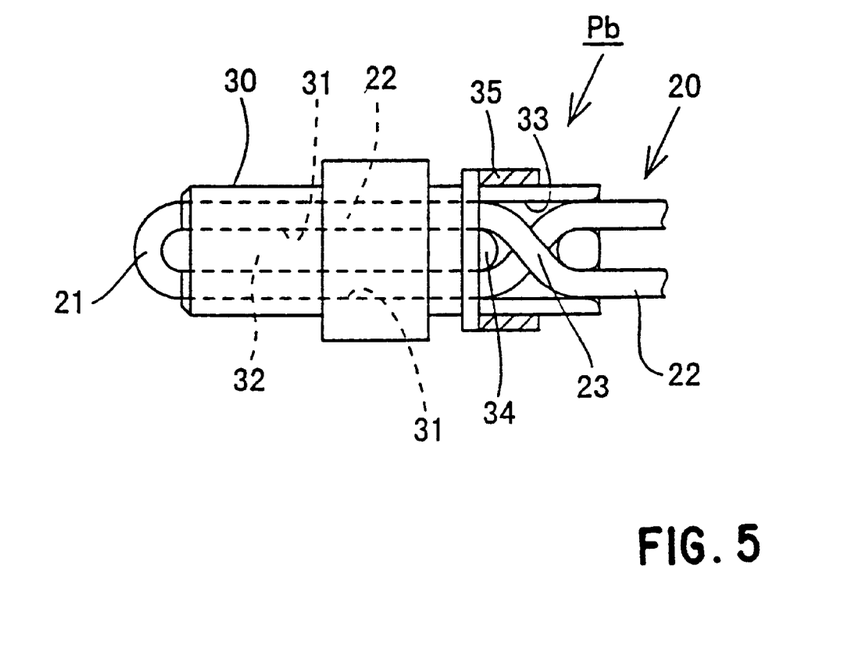
FIG. 5 is a rear face view of embodiment 2.
Figure 6:
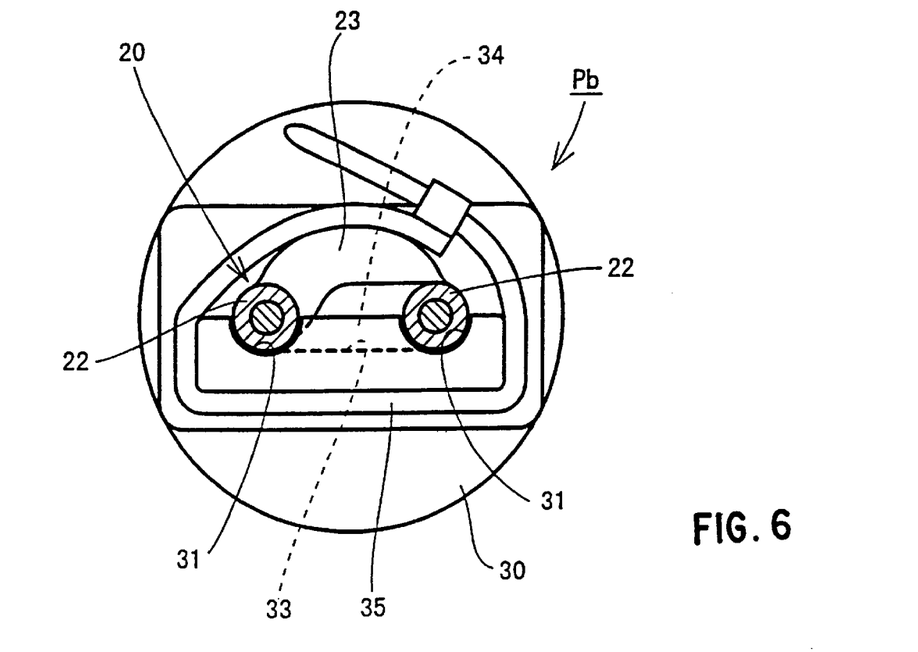
FIG. 6 is a rear face view of embodiment 2.
Figure 7:
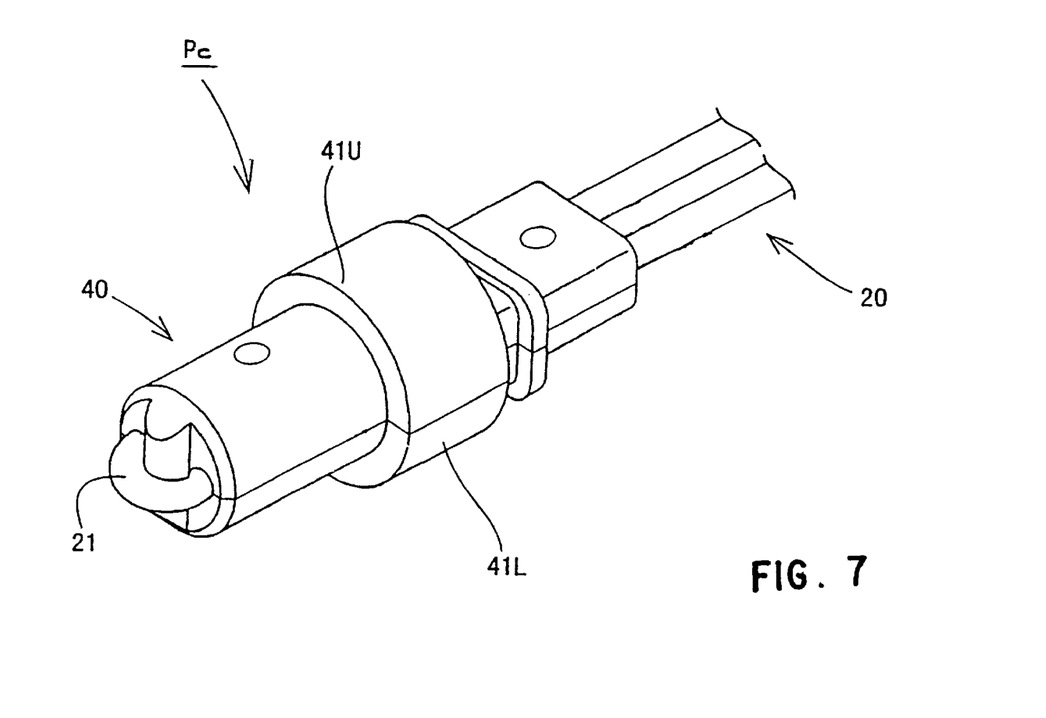
FIG. 7 is a disassembled diagonal view of embodiment 3.
Figure 8:
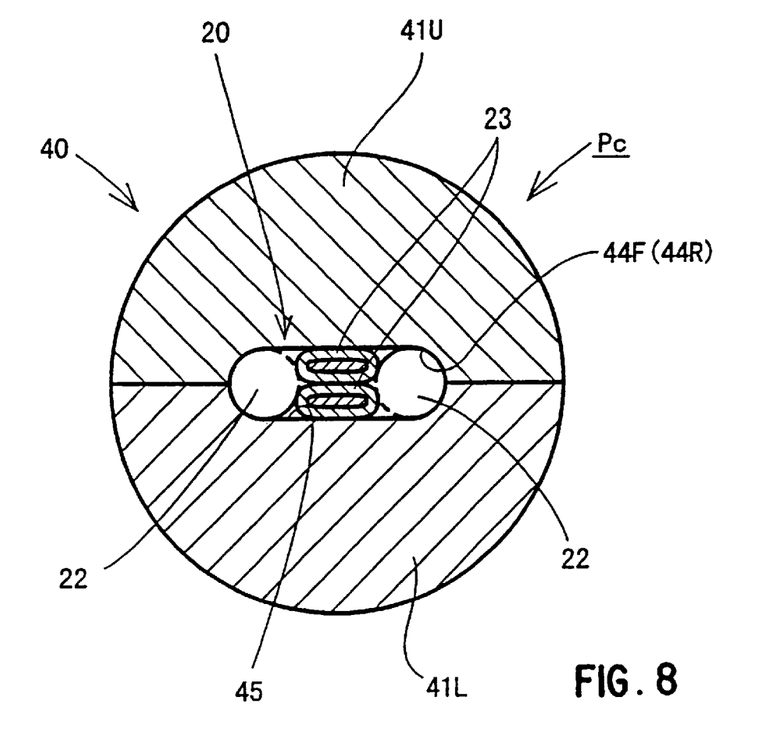
FIG. 8 is an expanded cross-sectional view of embodiment 3.
Figure 9:
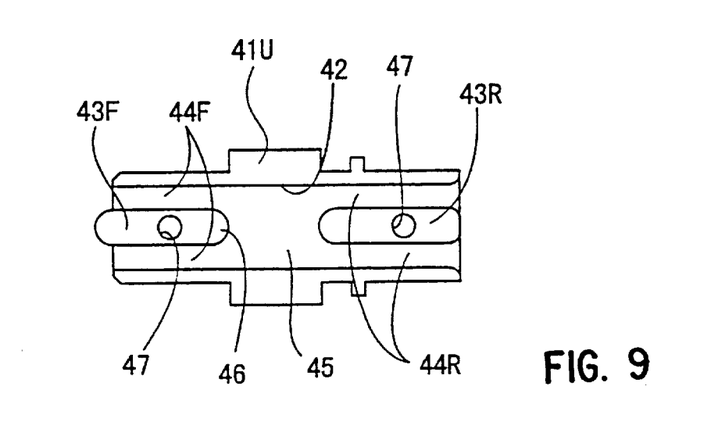
FIG. 9 is a base face view of an upper half member of embodiment 3.
Figure 10:
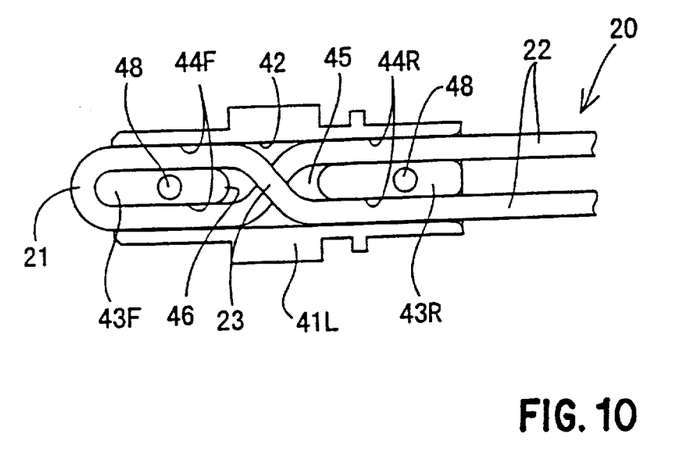
FIG. 10 is a plan view of a lower half member of embodiment 3.
Figure 11:
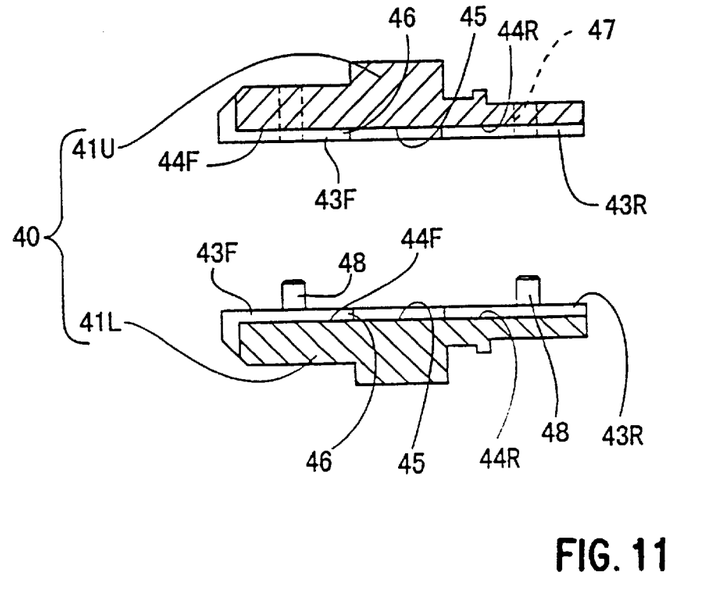
FIG. 11 is a cross-sectional view showing the half members of embodiment 3 in a separated state.

Next, a second embodiment of the present invention is explained with the aid of FIGS. 4 to 6.

In an abrasion detecting probe Pb of embodiment 2, a means for regulating the anterior movement of the detecting electric wire 20 differs in configuration from that of embodiment 1. The configuration of the other parts is the same as in embodiment 1. Consequently, the same numbers are accorded to parts having the same configuration as in embodiment 1, and an explanation of the configuration, operation, and effects thereof is omitted.

Two through holes 31 pass between anterior and posterior end faces of a holder 30 of embodiment 2. These two through holes 31 are exposed to the exterior at the posterior end portion of the holder 30. A partition 32 separates the two through holes 31 at this exposed portion. A portion of this partition 32 is cut away, thus dividing the partition 32 into anterior and posterior portions. An intersecting wire distribution path 33 linking the two through holes 31 is formed by this cutting away of the partition 32. Further, the posterior end face of the anterior partition of the partition 32 that is divided into anterior and posterior portions forms a stopper member 34 which borders the intersecting wire distribution path 33.

The extending members 22 of the detecting electric wire 20 which extend in a posterior direction along the two through holes 31 from the anterior end of the bent member 21, intersect in the intersecting wire distribution path 33 Oust behind the stopper member 34). This intersection forms an X-shape when seen from above. Then the extending members 22 pass along the through holes 31 at the posterior of the intersecting portion 23, the left and right sides thereof now having been reversed, and extend outwards from the posterior of the holder 30. The intersecting portion 23 of the detecting electric wire 20 is above the partition 32, and this rising portion is bound to the holder 30 by a cable band 35, this cable band 35 extending along the outer circumference face of the holder 30. By this means, the intersecting portion 23 of the detecting electric wire 20 is unified with the posterior end portion of the holder 30 and is maintained in an intersecting state. As shown in FIG. 4, this intersecting portion 23 is positioned close to the posterior of the stopper member 34.

In the abrasion detecting probe Pb of embodiment 2, even if a strong pulling force is exerted on the detecting electric wire 20 from the anterior (the side of the rotor R) when the bent member 21 of the detecting electric wire 20 comes into contact with the rotor R due to the continuing abrasion of the brake lining B, the intersecting portion 23 of the detecting electric wire 20 will catch against the stopper member 34, thereby preventing the detecting electric wire 20 from moving in an anterior direction relative to the holder 30.

Further, the intersecting wire distribution path 33 protrudes from the side face of the holder 30 and, consequently, the operation of causing the detecting electric wire 20 to intersect can be easily performed. The detecting electric wire 20 can be supported in an intersecting state between the time that it is intersected and the cable band 35 is attached to support it in spite of the fact that the detecting electric wire 20 is in an exposed state. This is because the intersecting portion is guided along the intersecting wire distribution path 33.

Next, a third embodiment of the present invention is explained with the aid of FIGS. 7 to 11.

In an abrasion detecting probe Pc of embodiment 3, the configuration of a means to maintain a detecting electric wire 20 in an intersecting state differs from the configuration of embodiment 1. The configuration of the other parts is the same as in embodiment 1. Consequently, the same numbers are accorded to parts having the same configuration as in embodiment 1, and an explanation of the configuration, operation, and effects thereof is omitted.

A holder 40 of embodiment 3 comprises two joined half members 41U and 41L, the joining of these half members 41U and 41L forming a through path within the holder 40 for the detecting electric wire 20. The half member 41U, located on the upper side in FIGS. 7 and 11, has a wire distribution groove 42 passing through the holder 40 from an anterior end face to a posterior end face thereof, and two partitioning protrusions 43F and 43R are formed at the anterior and posterior of this wire distribution groove 42. Within this wire distribution groove 42, the area to the left and right sides of the anterior partitioning protrusion 43F forms an anterior parallel wire distribution path 44F, and the area to the left and right sides of the posterior partitioning protrusion 43R forms a posterior parallel wire distribution path 44R. Moreover, the area between the anterior and posterior partitioning protrusions 43F and 43R forms an intersecting wire distribution path 45, this linking the anterior and posterior parallel wire distribution paths 44F and 44R. The posterior end face of the anterior partitioning protrusion 43F forms a stopper member 46 which borders the intersecting wire distribution path 45. Insertion holes 47 are formed in the two partitioning protrusions 43F and 43R, these insertion holes 47 passing therethrough to the outer face of the half member 41U. In the same manner as the upper half member 41U, the divided face of the lower half member 41L has a wire distribution groove 42, anterior and posterior partitioning protrusions 43F and 43R, an anterior parallel wire distribution path 44F, a posterior parallel wire distribution path 44R, and an intersecting wire distribution path 45. In addition, insertion pins 48 protrude from the partitioning protrusions 43F and 43R, these insertion pins 48 being inserted into the insertion holes 47 of the upper half member 41U.

When the upper and lower half members 41U and 41L are joined together, a wire distribution space is formed with the holder 40. This wire distribution space is invisible from the exterior, and the detecting electric wire 20 is distributed therein. Within this wire distribution space, the detecting electric wire 20 extends along the two anterior parallel wire distribution paths 44F, and is made to intersect in an X-shape just behind the stopper member 46 in the intersecting wire distribution path 45, and then extends along the two posterior parallel wire distribution paths 44R in a manner reversed from its distribution in the two anterior parallel wire distribution paths 44F. The height of the intersecting wire distribution path 45 when the two half members 41U and 41L are in a joined state is approximately identical with the size of the outer diameter of the detecting electric wire 20 when the latter is in a free state. The detecting electric wire 20 is arranged into an upper and lower layer in the intersecting portion 23. Consequently, the detecting electric wire 20 is pressed strongly together (see FIG. 8), and the detecting electric wire 20 is thereby maintained in an intersecting state. Furthermore, when the two half members 41U and 41L are in a joined state, the upper and lower partitioning protrusions 43F and 43R make contact with one another and consequently the detecting electric wire 20 is not able to move over these partitioning protrusions 43F and 43R to the left or right.

In the abrasion detecting probe Pc of embodiment 3, even if a strong pulling force is exerted on the detecting electric wire 20 from the anterior (the side of the rotor R) when the bent member of the detecting electric wire 20 comes into contact with the rotor R due to the continuing abrasion of the brake lining B, the intersecting portion 23 of the detecting electric wire 20 will catch against the stopper member 46, thereby preventing the detecting electric wire 20 from moving in an anterior direction relative to the holder 40.

Further, the placement of the detecting electric wire 20 is carried out when the two half members 41U and 41L are in a separated state, the wire distribution groove 42 for this wire placement being exposed to the exterior. As a result, the operations of placing the detecting electric wire 20 and making it intersect can be performed easily. Moreover, the detecting electric wire 20 can be supported in an intersecting state between the time that the placement and the intersection are carried out and the joined half members 41U and 41L are joined together in spite of the fact that the detecting electric wire 20 is in an exposed state. This is because the intersecting portion is located along the intersecting wire distribution path 45.

Further, when the two half members 41U and 41L are in a joined state, the intersecting portion 23 of the detecting electric wire 20 is inside the holder 40 and is completely invisible from the exterior. Consequently, foreign objects are unable to enter from the exterior of the intersecting portion 23 and cannot interfere with the wire distribution path or the intersecting state of the detecting electric wire 20.

Furthermore, the present invention is not limited to the embodiments described above with the aid of figures. For example, the possibilities described below also lie within the technical range of the present invention. In addition, the present invention may be embodied in various other ways without deviating from the scope thereof.

Figure 12:
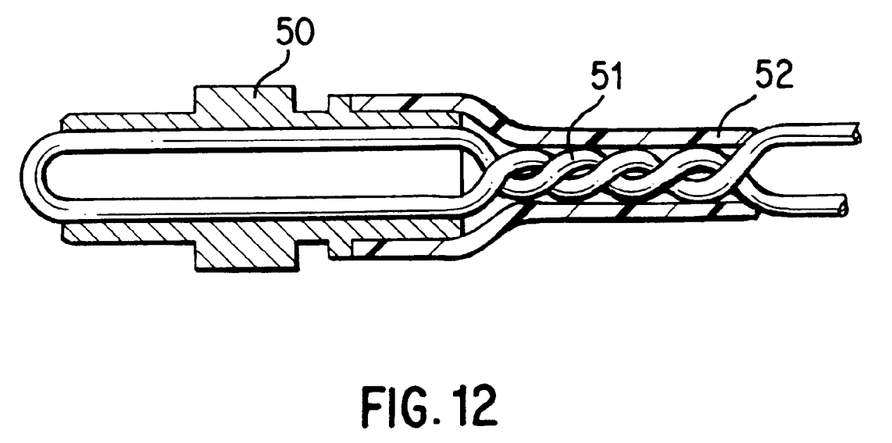
FIG. 12 is a partially cut away plan view of embodiment 4.

(1) In the present embodiments, the detecting electric wire is caused to intersect only once. However, according to the present invention, it is equally possible that the detecting electric wire 51 in a probe 50 has a twisted shape whereby it intersects a plurality of times.

(2) In embodiment 1 and embodiment 2, a binding member other than a cable band, such as a thermal contraction tube 52, may be used as a means to bind the detecting electric wire at the intersecting portion.

What is claimed is:

1. A wear sensor for the friction member of a brake, the sensor comprising an elongate wire holder having opposite first and second end walls and a pair of laterally spaced wire paths extending between the end walls,
   a wire having a bent end to detect brake wear, a segment extending along each of the wire paths such that rearward movement of the bent end is blocked by the first end wall of the holder, and two free ends extending away from said second end wall, the two segments rearward of the second end wall being intersected and having a lateral spacing narrower than the wire paths, and
   a retainer holding the intersected wire segments to prevent their separation such that forward movement of the wire is blocked by the second end wall.

2. A sensor according to claim 1 wherein said retainer comprises an enclosure for said wire, the enclosure defining said retainer and a distribution channel for said wire.

3. A sensor according to claim 1 wherein said retainer comprises an externally applied band.

4. A sensor according to claim 3 wherein said band comprises a ratchet cable tie.

5. A sensor according to claim 3 wherein said retainer comprises a thermal contraction tube.

6. A sensor according to claim 2 wherein said wire distribution channel has two limbs to guide said wire segments to an exterior of said enclosure.

7. A sensor according to claim 2 wherein said enclosure comprises two half-shells, a portion of said channel being formed in each half-shell.

8. A sensor according to claim 6 wherein said enclosure comprises two half-shells, a portion of said channel being formed in each half-shell.

9. A sensor according to claim 7 where said wire is clamped between said half-shells.

10. A sensor according to claim 8 where said wire is clamped between said half-shells.

11. A wear sensor for the friction member of a brake, the sensor comprising an elongate wire holder opposite first and second end walls and a pair of laterally spaced wire paths extending between the end walls, a wire having a bent end to detect brake wear, a segment extending along each of the wire paths such that rearward movement of the bent end is blocked by the first end wall of the holder, the two segments of the wire further extending rearward of the second end wall and mutually intersecting at a location close to a stopper on the second end wall, and a thermal contraction tube holding the intersected portion of the wire to thereby prevent separation of the intersected wire segments so that the stopper resists movement of the wire in the direction of said first end wall.

12. A sensor according to claim 11 wherein the wire segments rearward of the second end wall are intersected a plurality of times to have a twisted shape.

* * * * *